(12) United States Patent
Wu

(10) Patent No.: US 8,522,444 B2
(45) Date of Patent: Sep. 3, 2013

(54) CABLE CONTROL SET FOR EXTENDED REACH GARDEN SHEARS

(75) Inventor: Shih-Piao Wu, Lu Kang Town (TW)

(73) Assignee: Jiin Haur Industrial Co., Ltd., Lu Kang Town, Chang Hua Hsien (TW)

( * ) Notice: Subject to any disclaimer, the term of this patent is extended or adjusted under 35 U.S.C. 154(b) by 225 days.

(21) Appl. No.: 12/984,579

(22) Filed: Jan. 4, 2011

(65) Prior Publication Data
US 2012/0167396 A1 Jul. 5, 2012

(51) Int. Cl.
*B26B 13/26* (2006.01)

(52) U.S. Cl.
USPC .............................. 30/249; 30/245; 30/296.1

(58) Field of Classification Search
USPC ................. 30/245, 249, 250, 251, 296.1, 257
See application file for complete search history.

(56) References Cited

U.S. PATENT DOCUMENTS

| 6,671,963 | B1 * | 1/2004 | Huang | 30/122 |
| 6,694,621 | B1 * | 2/2004 | Boley et al. | 30/249 |
| 2003/0106223 | A1 * | 6/2003 | Lee | 30/249 |
| 2003/0177644 | A1 * | 9/2003 | Cheng | 30/249 |
| 2004/0045175 | A1 * | 3/2004 | Jang | 30/249 |

* cited by examiner

*Primary Examiner* — Andrea Wellington
*Assistant Examiner* — Brendan Ayer

(57) ABSTRACT

A cable control set for extended reach garden shears, the extended reach garden shears having a cutting section comprising at two blades pivoted together, the cutting section attached to a first location of an extension rod, the cutting section capable of being driven by the cable. Two guiding rollers are pivoted onto a second location of the extension rod, and the cable is placed between the two guiding rollers, a rotatable member is pivoted onto an opposite side of the extension rod by a corresponding securing member; and a rotating arm is pivoted onto a top surface of the rotatable member via a corresponding securing member, and the two auxiliary rollers are pivoted onto the one end of the rotating arm, the cable is placed between the two auxiliary rollers.

6 Claims, 6 Drawing Sheets

CABLE CONTROL SET FOR EXTENDED REACH GARDEN SHEARS

BACKGROUND OF THE INVENTION

1. Field of the Invention

The present invention relates to a cable control set for extended reach garden shears, and more particularly to a cable control set for extended reach garden shears utilizing two guiding rollers and two auxiliary rollers to assist the cable.

2. Description of the Related Art

Currently, typical extended reach garden shears are used for trimming branches or harvesting fruit from trees, thereby relieving users of the need for climbing and increasing work efficiency.

However, typical extended reach garden shears require significant strength to operate their control cables, which is very inconvenient and difficult. Furthermore, the cable may come into direct contact with the extended reach garden shears when pulled or changing a swing angle of the head portion of the extended reach garden shears, which can lead to abrasion of the cable.

Therefore, it is desirable to provide a cable control set for extended reach garden shears to mitigate and/or obviate the aforementioned problems.

SUMMARY OF THE INVENTION

An objective of the present invention is to provide a cable control set for extended reach garden shears, which provides many different cutting angles.

In order to achieve the above-mentioned objectives, extended reach garden shears disclosed in an embodiment of the present invention have a cutting section comprising a moveable blade and a fixed blade pivoted together; the cutting section is attached to an upper end of an extension rod via a swing device, and the cutting section is capable of being driven by a cable. The cable passes around a pulley and then into the extension rod, and after a predetermined length exits the extension rod and attaches to a sliding cover jacketed onto an external periphery of the extension rod, such that the sliding cover is capable of sliding along the extension rod in response to the cable to control movements of the cutting section. Two guiding rollers are pivoted onto a predetermined location of the extension rod, and the cable is placed between the two guiding rollers. Each guiding roller includes a first groove around its outer periphery such that the cable is sandwiched within the first grooves. Furthermore, a rotatable member is pivoted onto an opposite side of the extension rod by a corresponding securing member, and a rotating arm is pivoted onto a top surface of the rotatable member via a corresponding securing member. One end of the rotating arm extends between the pulley and the end of the extension rod and has an L shape. The two auxiliary rollers are pivoted onto the one end of the rotating arm, the cable is placed between the two auxiliary rollers.

With above-mentioned structure, following benefits can be obtained: 1. The two guiding rollers pivoted onto the upper end of the extension rod and the two auxiliary rollers pivoted above the upper end of the extension rod enable the cable to smoothly slide along the first groove and the second groove, therefore, when the cable is pulled downward, upward or by the swing device, it is always smoothly guided by the two guiding rollers and the two auxiliary rollers. 2. When the cable is pulled by the sliding cover or the swing device for different cutting angles, such that the rotatable member is pulled by the cable to rotate around the securing member and swing with the swing device. Therefore, the rotating arm rotates around the securing member and also generates rotation with the changing angle of the cable. Accordingly, the cable is separated from the extension rod by the guiding rollers 40 and the auxiliary roller, such that the cable does not rub against the extension rod and is thus free from abrasion to provide a longer lifetime.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
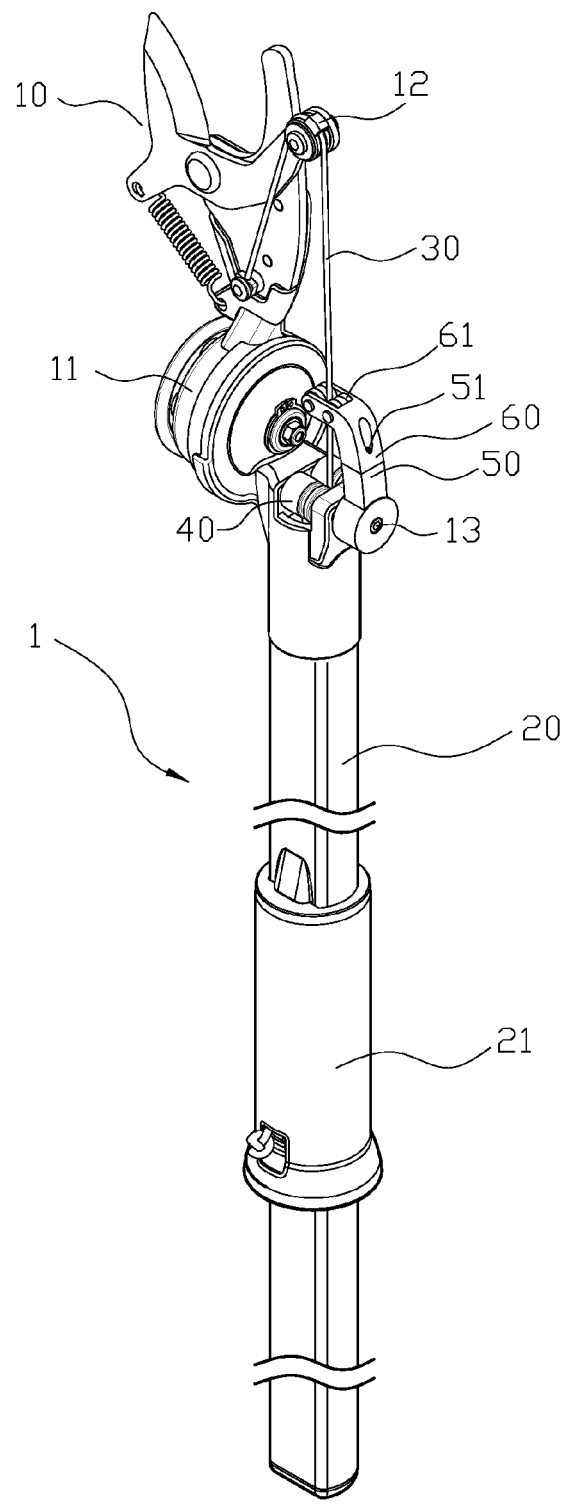
FIG. 1 is a perspective view of an embodiment of the present invention.
Figure 2:
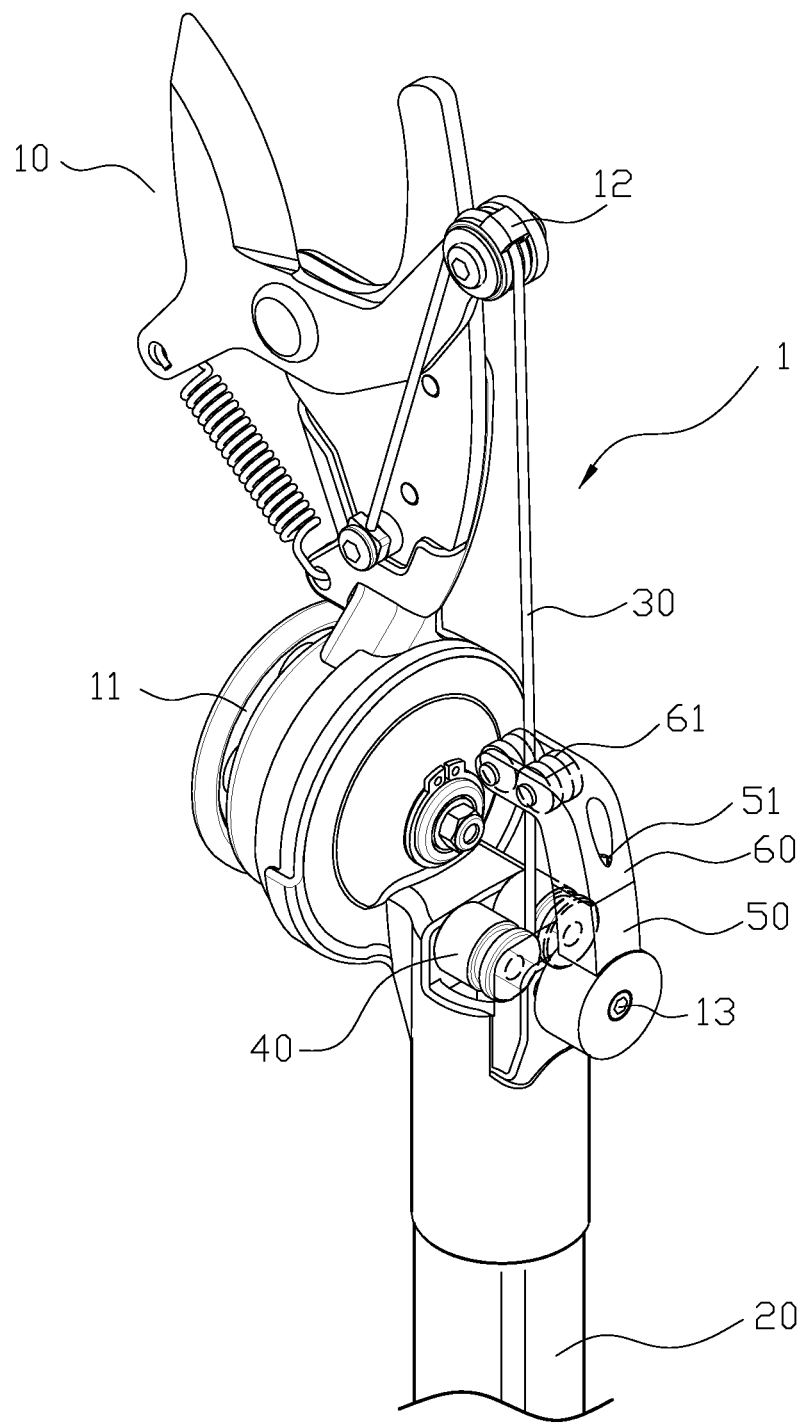
FIG. 2 is a local detailed view of an embodiment of the present invention.
Figure 3:
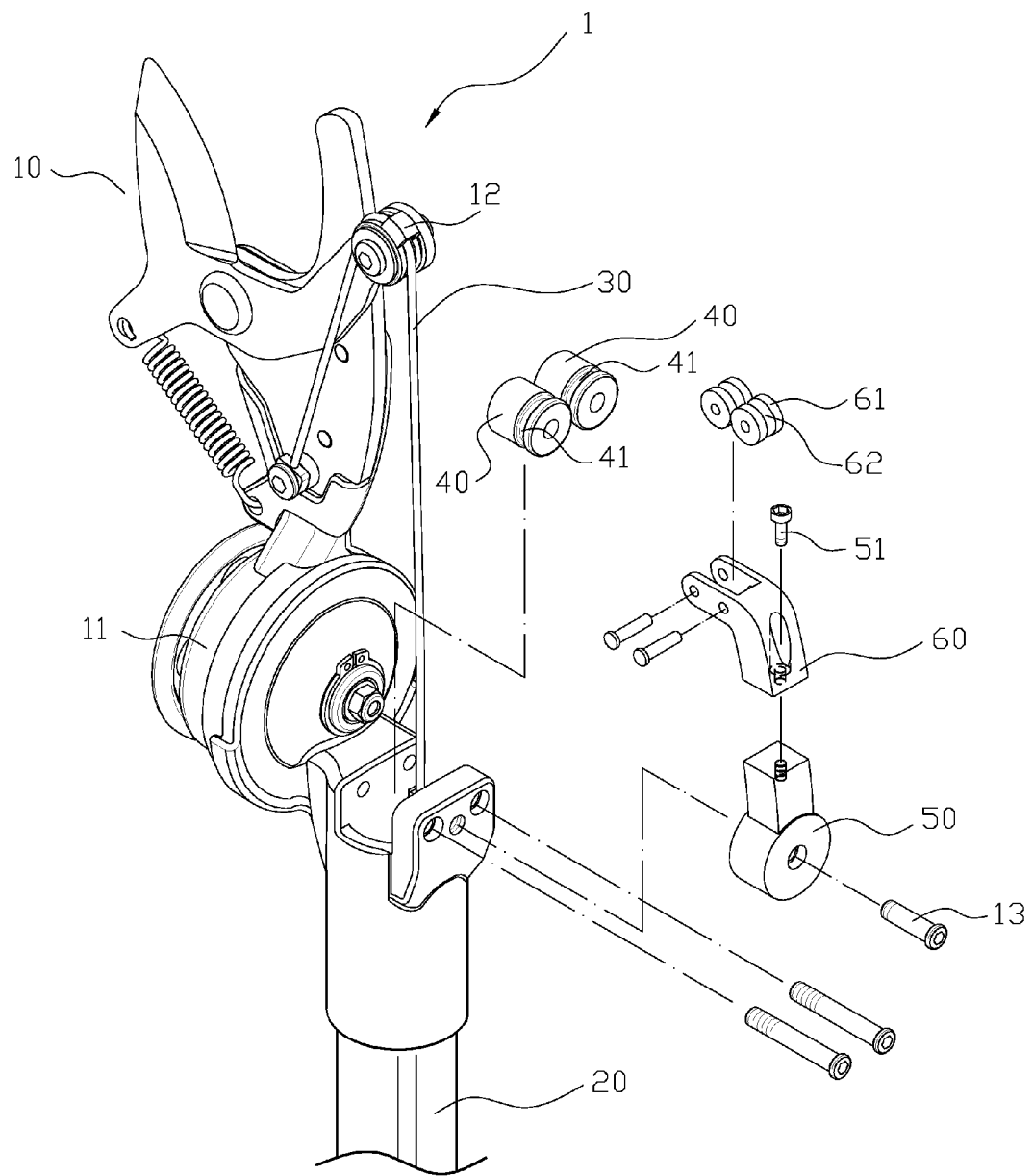
FIG. 3 is a perspective exploded view of an embodiment of the present invention.
Figure 4:
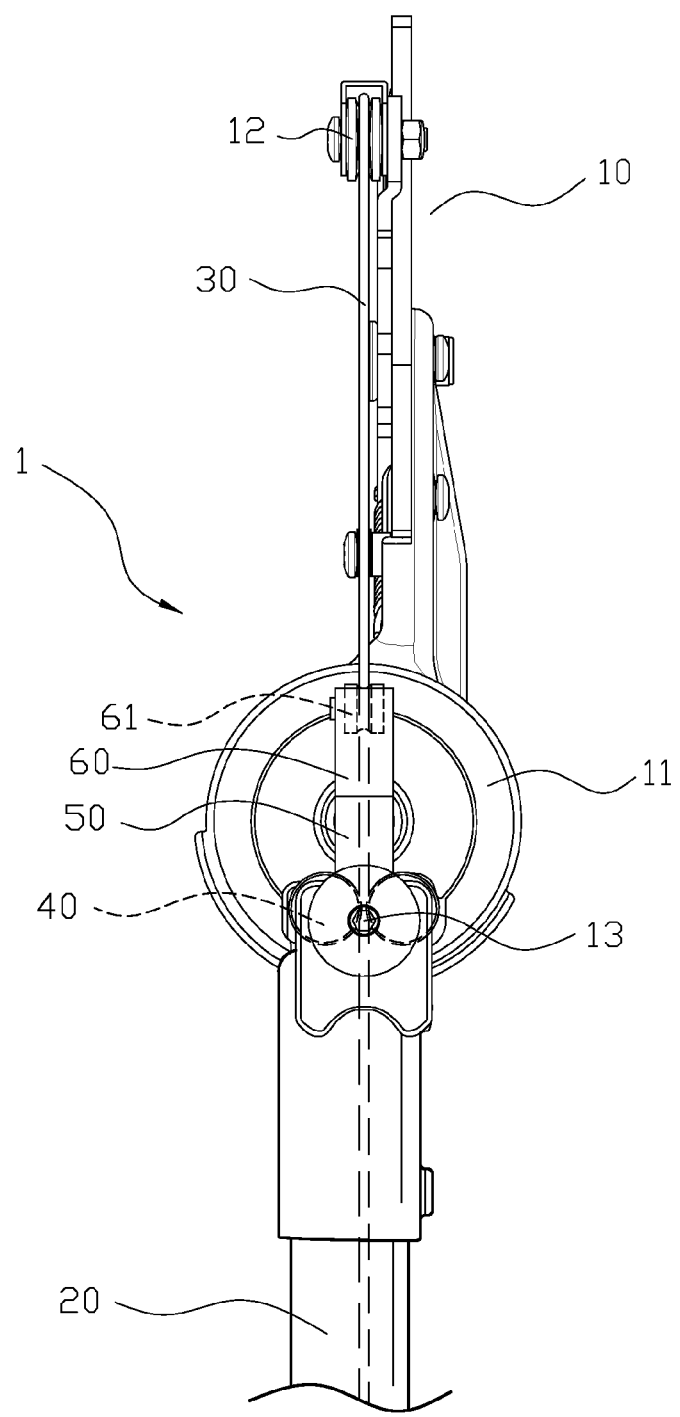
FIG. 4 is a side view of an embodiment of the present invention.

Please refer to FIG. 1 to FIG. 4. Extended reach garden shears 1 have a cutting section 10 comprising a moveable blade and a fixed blade pivoted together; the cutting section 10 is attached to an upper end of an extension rod 20 via a swing device 11, and the cutting section 10 is capable of being driven by a cable 30. The cable 30 passes around a pulley 12 and then into the extension rod 20, and after a predetermined length exits the extension rod 20 and attaches to a sliding cover 21 jacketed onto an external periphery of the extension rod 20, such that the sliding cover 21 is capable of sliding along the extension rod 20 in response to the cable to control movements of the cutting section 10. Two guiding rollers 40 are pivoted onto a predetermined location of the extension rod 20, and the cable 30 is placed between the two guiding rollers 40. Each guiding roller 40 includes a first groove 41 around its outer periphery such that the cable 30 is sandwiched within the first grooves 41. Furthermore, a rotatable member 50 is pivoted onto an opposite side of the extension rod 20 by a corresponding securing member 13, and a rotating arm 60 is pivoted onto a top surface of the rotatable member 50 via a corresponding securing member 51. One end of the rotating arm 60 extends between the pulley 12 and the end of the extension rod 20 and has an L shape. The two auxiliary rollers 61 are pivoted onto the one end of the rotating arm 60, the cable 30 is placed between the two auxiliary rollers 61. Each auxiliary roller 61 further includes a second groove 62 around its outer periphery such that the cable 30 is sandwiched in the second grooves 62. The auxiliary rollers 61 and the guiding rollers 40 are installed perpendicularly with each other.

Figure 5:
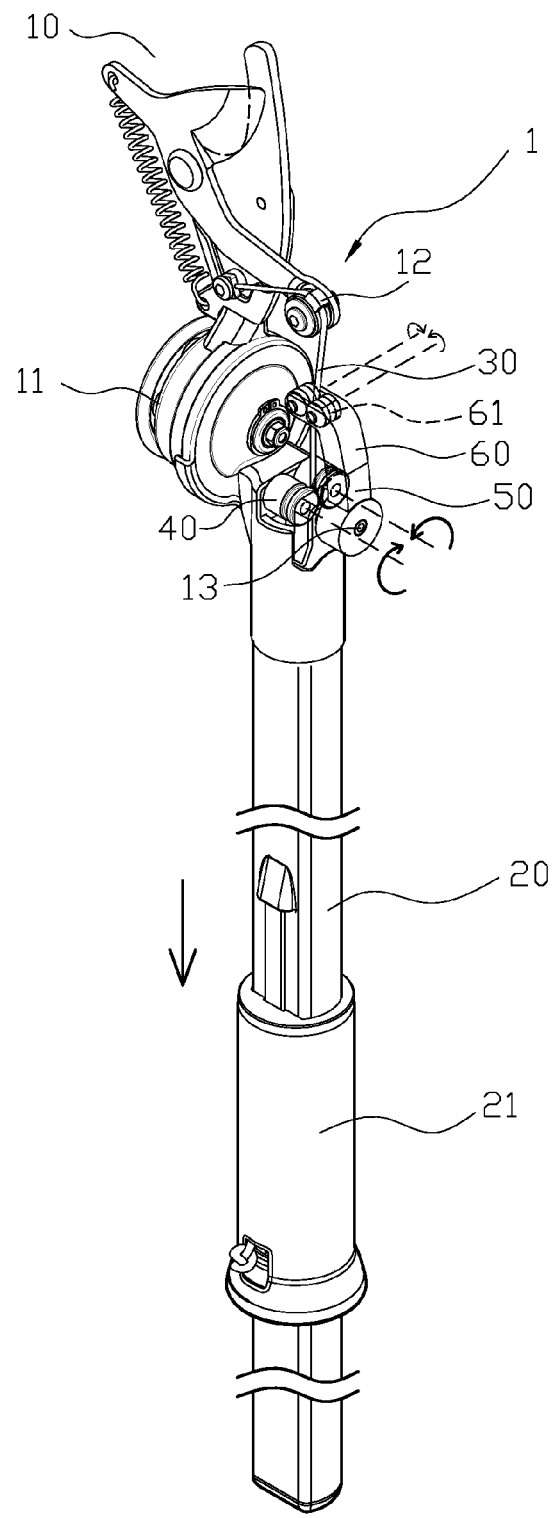
FIG. 5 illustrates usage of cable movement according to an embodiment of the present invention.
Figure 6:
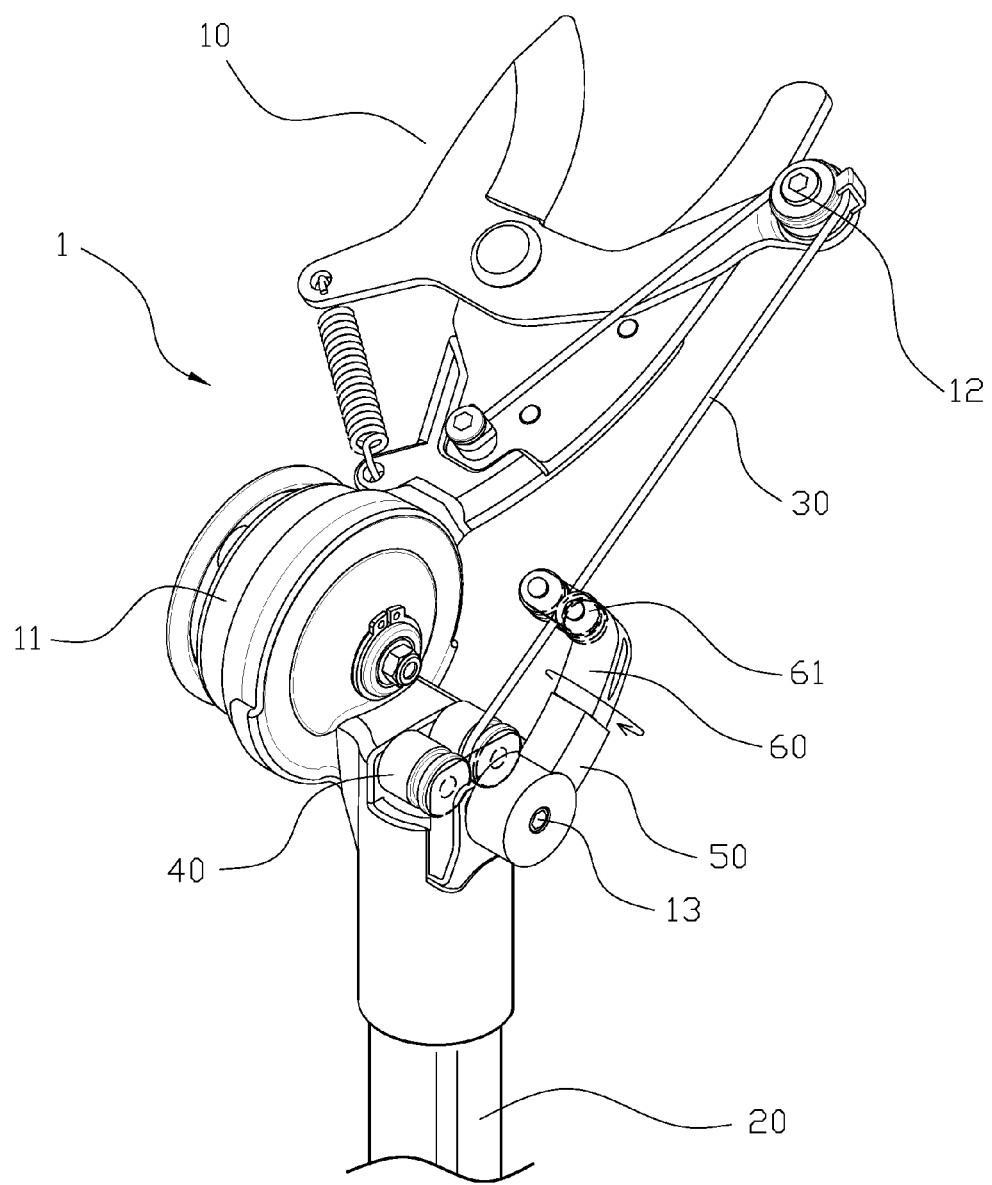
FIG. 6 illustrates movement of a swing device of an embodiment of the present invention.

For operations, before being used, two blades of the cutting section 10 are held open in order to place branches between them. When the user places the blades at a proper position to cut off the branch, he or she pushes down the sliding cover 21 to pull down the cable 30 to drive the moveable blade towards to the fixed blade, such that the branch placed between the two blades of the cutting section 10 is cut off. After the cutting movement, he or she can release the sliding cover 21 to enable the moveable blade of the cutting section 10 to be pulled back to the original position by an attached spring. The cable 30 and the sliding cover 21 are pulled simultaneously, and the two guiding rollers 40 pivoted onto the upper end of the extension rod 20 and the two auxiliary rollers 61 pivoted above the upper end of the extension rod 20 enable the cable 30 to smoothly slide along the first groove 41 and the second groove 62. Therefore, when the cable 30 is pulled downward, upward or by the swing device, it is always smoothly guided by the two guiding rollers 40 and the two auxiliary rollers 61, as shown in FIG. 5, which can reduce the required strength for operations. When the cable 30 is pulled by the sliding cover 21 or the swing device 11 for different cutting angles, as shown in FIG. 6, such that the rotatable member 50 is pulled by the cable 30 to rotate around the securing member 13 and swing with the swing device 11. Therefore, the rotating arm 60 rotates around the securing member 51 and also generates rotation with the changing angle of the cable 30. Accordingly, the cable 30 is separated from the extension rod 20 by the guiding rollers 40 and the auxiliary roller 61, such that the cable 30 does not rub against the extension rod 20 and is thus free from abrasion to provide a longer lifetime.

With above-mentioned structure, following benefits can be obtained: 1. The two guiding rollers 40 pivoted onto the upper end of the extension rod 20 and the two auxiliary rollers 61 pivoted above the upper end of the extension rod 20 enable the cable 30 to smoothly slide along the first groove 41 and the second groove 62, therefore, when the cable 30 is pulled downward, upward or by the swing device, it is always smoothly guided by the two guiding rollers 40 and the two auxiliary rollers 61. 2. When the cable 30 is pulled by the sliding cover 21 or the swing device 11 for different cutting angles, such that the rotatable member 50 is pulled by the cable 30 to rotate around the securing member 13 and swing with the swing device 11. Therefore, the rotating arm 60 rotates around the securing member 51 and also generates rotation with the changing angle of the cable 30. Accordingly, the cable 30 is separated from the extension rod 20 by the guiding rollers 40 and the auxiliary roller 61, such that the cable 30 does not rub against the extension rod 20 and is thus free from abrasion to provide a longer lifetime.

Although the present invention has been explained in relation to its preferred embodiment, it is to be understood that many other possible modifications and variations can be made without departing from the spirit and scope of the invention as hereinafter claimed.

What is claimed is:

1. A cable control set for extended reach garden shears, the extended reach garden shears having a cutting section comprising at least two blades pivoted together and a pulley, the cutting section attached to a first location of an extension rod, the cutting section capable of being driven by the cable that passes around the pulley; characterized in that:

at least two juxtaposed guiding rollers are each rotatably mounted onto a second location of the extension rod, and the cable is disposed between the two juxtaposed guiding rollers, a rotatable member pivotably mounted directly onto a side of the extension rod by a corresponding securing member;

a rotating arm is rotatably mounted onto a top surface of the rotatable member via a corresponding securing member, one end of the rotating arm extending between the pulley and the end of an extension rod and being L-shaped; and at least two juxtaposed auxiliary rollers are respectively rotatably mounted onto the one end of the rotating arm, the cable disposed between the two juxtaposed auxiliary rollers;

wherein when the cable is pulled, the two juxtaposed guiding rollers and the two juxtaposed auxiliary rollers rotate.

2. The cable control set for extended reach garden shears as claimed in claim 1, wherein the cutting section utilizes a swing device that couples to the extension rod.

3. The cable control set for extended reach garden shears as claimed in claim 1, wherein the cable passes around the pulley and then into the extension rod, and after a predetermined length exits the extension rod and attaches to a sliding cover jacketed onto an external periphery of the extension rod, such that the sliding cover is capable of sliding along the extension to control movements of the cutting section.

4. The cable control set for extended reach garden shears as claimed in claim 1, wherein each guiding roller further includes a first groove around its outer periphery such that the cable is sandwiched in the first grooves.

5. The cable control set for extended reach garden shears as claimed in claim 1, wherein each auxiliary roller further includes a second groove around its outer periphery such that the cable is sandwiched in the second grooves.

6. The cable control set for extended reach garden shears as claimed in claim 1, wherein rotational axes of the juxtaposed auxiliary rollers are substantially perpendicular to rotational axes of the juxtaposed guiding rollers.

* * * * *